Feb. 18, 1941.    F. W. DAVIS    2,232,657
EXPANSION JOINT AND METHOD OF MAKING THE SAME
Filed Jan. 20, 1940    2 Sheets-Sheet 2

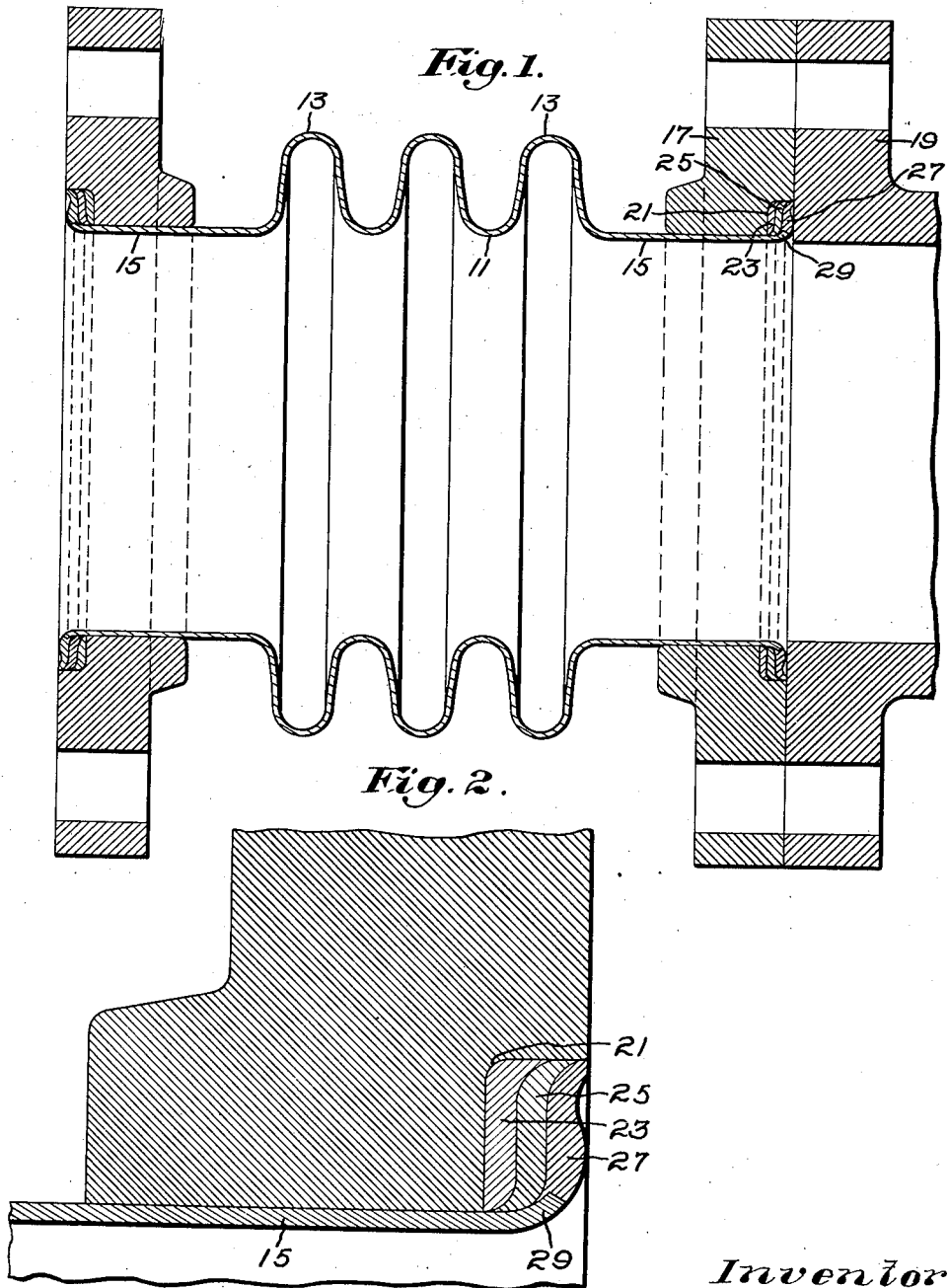

Inventor:
Frank W. Davis.
Attys.

Patented Feb. 18, 1941

2,232,657

UNITED STATES PATENT OFFICE 2,232,657

EXPANSION JOINT AND METHOD OF MAKING THE SAME

Frank W. Davis, Milford, Del., assignor to E. B. Badger & Sons Company, Boston, Mass., a corporation of Massachusetts Application January 20, 1940, Serial No. 314,838

9 Claims. (Cl. 29—157)

This invention relates to expansion joints and methods of making the same and more particularly, though not exclusively, to joints intended for connection in a pipe line where expansions and contractions of the latter in the direction of its axial length are to be equalized by the movements of a corrugated element of the joint.

One object of the present invention is the production of an improved form of expansion joint in which use is made of a corrugated element of stainless steel under such conditions that the desirable properties of the steel are preserved and availed of.

Chromium-nickel alloy steels of the austenitic type have certain characteristics which render them highly desirable for use in forming the corrugated element of an expansion joint. These steels are classed by their relative proportions of chromium and nickel which are present in varying amounts, an 18–8 steel representing one containing 18% and 8% of nickel. A variety of such steels are in commercial use, such as 16–12, 25–12, 25–20, as well as others, differing more or less in respect to stiffness, ductility and other properties.

It is well known that resistance to corrosion in such steels is affected by the proportion of carbon present, a stainless steel of relatively low carbon content having a greater capacity to resist corrosion than one of relatively high carbon content. For best resistance to corrosion, the proportions of carbon in such steel should be not greater, and should be preferably less, than 0.10%.

The characteristic properties of stainless steel, particularly its corrosion resistance, as well as preservation of other important physical properties under extreme ranges of temperature, its ductility and resistance to fatigue, render this metal when having a low carbon content particularly useful in expansion joints. Certain difficulties are encountered, however, in many cases where stainless steel is required to be joined by welding to a body of ferrous metal of different composition, as where the carbon content of the latter is greater than that of the low carbon stainless steel, or where its mass is relatively greater than that of the stainless steel.

In the construction of an expansion joint, after the expansion element has been worked and formed into shape to present the required corrugated formation and then heat treated to restore its ductility, it is necessary that it be joined to a pipe member of the pipe line to provide a fluid tight joint. Such pipe member may be a flanged ring to be bolted to a similar flange of an adjoining pipe section, or, in the case of a welded pipe line, may be a pipe nipple which in turn is welded to such adjoining pipe section.

In the case of corrugated shells of cuprous metal, the attachment of the shell to a tightly fitting ring flange has been effected by bending or swaging the protruding end of the shell over that face of the flange which is to be bolted to the adjoining pipe flange, leaving the bent over end clamped between the two flanges. In the case of a welded pipe line, shells of cuprous metal have been attached to the pipe nipple by brazing.

If it is attempted to apply a stainless steel shell to the flange ring, as previously done in the case of shells of cuprous metal, by bending the end of the shell over the face of the flange, an annealing heat treatment must thereafter be applied to the end of the shell and the flange as a unit to restore the ductility of the shell end and remove the brittleness arising from the swaging operation. Due to different conditions encountered in the effective heat treatment of stainless steel and the metal of the flange, it is impracticable to effect such heat treatment without impairing the properties either of the stainless steel through carbon precipitation or impairing the structure of the flange, or both. Such heat treatment of the shell and flange as a unit, furthermore, if attempted, is difficult and costly. The brazing of a stainless steel shell to the pipe nipple is also impracticable, due to its detrimental effect on the metal of the stainless steel and due to the incapacity of the brazed joint to withstand those abnormally high temperatures which it may be called on to meet in service, and the capacity to meet which is one object of the use of stainless steel in a joint of this description.

A welded attachment of the stainless steel to the pipe member to provide a fluid tight joint is highly desirable. If it be attempted, however, to weld a shell of stainless steel directly to the metal of the flange or pipe nipple, the characteristics of the stainless steel are materially changed at and about the joint so that a substantial loss in its desirable properties results.

The flanges and pipe nipples customarily employed for this purpose are composed of mild steel having a carbon content which, though not high, is substantially higher than that of the low carbon stainless steel used for resistance to corrosion, being ordinarily of the order of from 0.25 to 0.35% or more of carbon, as contrasted with a carbon contect of 0.10% or less in the stainless steel which is required for this purpose.

An attempt to attach a stainless steel sleeve directly to the metal of a pipe member by welding requires the fusing of the metal of the two bodies at and along their contacting surfaces. This not only tends to effect a dilution of the chromium and nickel content of the stainless steel by the iron from the flange or nipple, but also a migration of the carbon from the fused higher carbon steel to the fused lower carbon metal of the stainless steel, increasing the carbon content of the latter in the section thereof at and about the joint and along its grain boundaries and correspondingly reducing its resistance to corrosion thereat. The effect of such carbon migration, which is due primarily to the greater carbon content of the flange or pipe nipple, is further increased by the fact that a relatively small mass of low carbon stainless steel is presented to the weld by the thin sheet metal shell, as contrasted to the relatively large mass of higher carbon steel constituting the flange or pipe nipple to which the shell is being welded.

Furthermore, stainless steel is rendered quite susceptible to corrosion when it is in a stressed condition. When two pieces of metal are joined by welding, internal stresses are set up in each piece. In many instances these may be removed by stress-relieving heat treatment, but where stainless steel is welded to carbon steel of the type composing pipe flanges or pipe nipples, these stresses cannot be eliminated by heat treatment, since the coefficient of thermal expansion of stainless steel is approximately 60% greater than that of the carbon steel of which the pipe members are composed. If the stress be relieved in the stainless steel at the temperature at which the assembly is annealed, the differential contraction of the two grades of steel when cooled sets up additional stresses which are concentrated largely in the stainless element due to the large difference in the cross-section between that element and the pipe member. This leaves the stainless steel element at the joint extremely susceptible to stress corrosion.

One object of the present invention is to effect a welding attachment of a stainless steel element in an expansion joint to a pipe member of the pipe line so as to retain in large measure the normal properties of the stainless steel at and about the resulting welded joint.

Another object is to effect such welding attachment while avoiding such a migration of carbon from the metal of the pipe member to the metal of the stainless steel element as will materially lessen the capacity of the stainless steel to resist corrosion at the welded joint which is subject to corrosive influence.

Another object of the invention is to effect such welding attachment so that the stainless steel at its welded joint is largely free from stress corrosion which would be characteristic of a direct weld of the stainless steel to the pipe member.

These and other objects of the invention will be best understood by reference to the following description when taken in connection with the accompanying illustration of one specific embodiment thereof while its scope will be more particularly pointed out in the appended claims.

In the drawings:

Fig. 1 is a longitudinal sectional elevation, showing the corrugated element of a typical expansion joint, the usual external reinforcing rings and the end rings being omitted, and illustrating the means adopted for attaching a shell of stainless steel to a flanged pipe member;

Fig. 2 is a detail, on an enlarged scale, showing the parts in Fig. 1, which constitute the welded attachment of the stainless steel corrugated shell to the end flange of the joint;

Figure 3:
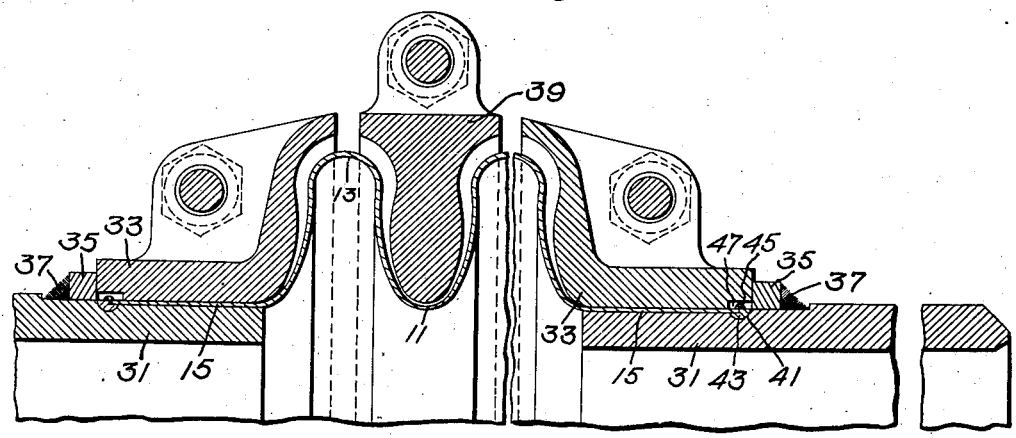
Fig. 3 is a longitudinal, sectional elevation of an expansion joint in which a corrugated stainless steel shell is connected to a pipe nipple for attachment to a welded pipe line.

Referring to the drawings, there is shown as an illustration of one application of the invention, an expansion joint designed for heavy duty in a pipe line, Fig. 1 illustrating such a joint intended to be clamped in position in the pipe line, and Fig. 3 a similar joint secured to a pipe nipple intended to be welded to the pipe line.

Referring to Fig. 1, the expansion joint element comprises a tubular shell or conduit 11 formed of sheet metal, herein of stainless steel, which may contain, by way of example, 18% chromium and 8% nickel, but having a low percentage of carbon content such, for example, as 0.07%. The thickness of the sheet metal walls of the tubular member will depend on the size of the joint and the service to which it is to be subjected, but a thickness of the order of from $\frac{1}{32}$ to $\frac{1}{16}$ of an inch may be given as an example.

The tubular member is provided with one or more relatively deep corrugations or circumferential enlargements 13, the number of which and the diameter of the shell depend on the service to which the joint is to be applied, the whole forming a continuous corrugated shell which may be interposed as an element in a pipe line to equalize the repeated expansions and contractions thereof encountered during service.

The opposite ends of the shell terminate each in a tubular end 15, between which and some member of the pipe line it becomes necessary to provide a fluid tight joint, the pipe member herein comprising the ring flange 17 by which the expansion joint is designed to be clamped to a similar abutting flange 19 on an adjoining pipe section.

In service, the expansion joint illustrated in Fig. 1 is provided with the usual reinforcing rings (such as shown in Fig. 3 but here omitted for simplicity) designed to limit the contraction of the shell and to equalize flexing at the several corrugations.

In this expansion joint, a fluid tight, welded joint is provided between each opposite tubular end 15 of the sleeve and the adjacent flange 17 which fits tightly over the sleeve. Such welded joint in the illustrated embodiment of the invention is formed in the following manner, as will be seen more clearly in Fig. 2.

The flange 17 is prepared by forming an annular recess 21 on the inner periphery of that face which is to be clamped against the flange of the adjacent pipe section, such that this recess will overlie the end of the tubular sleeve 15 when two parts are subsequently assembled.

A weld is then made between the inner walls of the recess 21 and an inlay or body 23 of stainless steel of relatively low carbon content, such as 0.07%, such that the inlay partly but not wholly fills the recess. The chromium-nickel content of the inlay 23 may be widely varied, but a 25–20 steel has been found preferable due to its ductility. This welding may be accomplished by depositing as the inlay a ring-like bead of fused metal from a welding rod composed of metal of the description indicated, this being done with the aid of an electric arc or other means commonly employed for this purpose. The inlay may be completed by a single bead and a single welding, but preferably comprises the initial bead 23 and a second metallic bead 25 of the same composition, the bead 25 being deposited on the bead 23 after the latter has been allowed to cool.

In the welding, a certain percentage of carbon will be taken up by the section of the first inlay adjacent its contacting walls from the higher carbon steel of the flange metal, while only a very slight increment in carbon, if any, is possible in the second bead for it can absorb only from the first bead and not from the flange metal direct, and only from the section of the first bead which is remote from the flange metal.

The result is that when the welding inlay is cooled, there is left a body of stainless steel welded into and over exposed walls of the recess but leaving unfilled a part of such recess near the flange face. Whether this inlay is formed from a single bead or two beads of stainless steel, that section of the inlay presented to the unfilled section of the recess is substantially free from carbon in excess of its normal original content.

After the inlay or inlays constituting the body of interposed stainless steel have cooled, the ring flange is fitted over the tubular end of the shell and, to complete the assembly, a third or sealing bead 27 is then deposited in such manner as to weld the end of the shell to the completed inlay, and in some such relation as is indicated in Figs. 1 and 2.

The extreme tip of the tubular sleeve, after the flange has been fitted thereon, may be given a slight outward flare at 29, as indicated in Fig. 2, to present its end section more favorably to the welding bead 27, or it may be left without such flare.

As a result of this welding operation, the stainless steel at or about the fluid tight joint between the sealing bead 27 and the end section of the tubular sleeve preserves its original low carbon content and at least its original content of chromium or nickel, and the joint benefits from the full capacity of the steel in respect to its original properties, and particularly in respect to its resistance to corrosion which may arise from the effect of the fluid transmitted in the pipe line.

Figure 4:
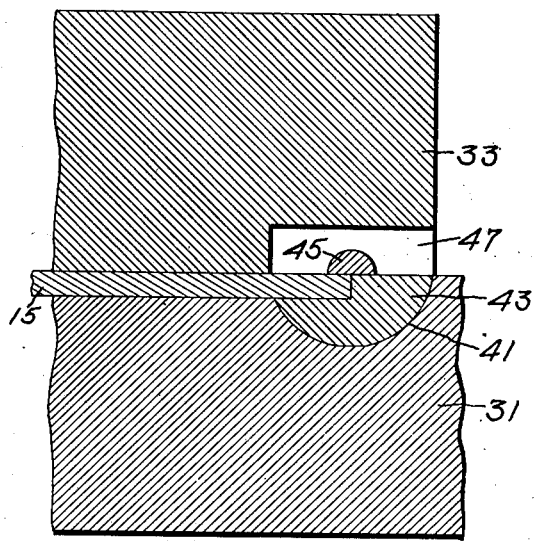
Fig. 4 is a detail, on an enlarged scale, of the parts in Fig. 3 which constitute the welded attachment there utilized.

The same principle is made use of in the case of a welded pipe line, an expansion joint for which is illustrated in Figs. 3 and 4. In this case each opposite tubular end 15 of a corrugated stainless steel shell 11 is attached by welding to a pipe nipple 31. The tightly fitting end ring 33 is then assembled over the end of the sleeve and held against longitudinal displacement by any suitable means such, for example, as an abutting steel ring 35 fitted over the nipple and welded to the nipple by a bead of welding metal 37.

In the joint illustrated in Fig. 3, the external reinforcement is shown assembled. This comprises the end rings 33 and intermediate reinforcing rings 39, one of which seats in each groove or depression between adjacent corrugations, the several rings being axially separable and independently movable with the expansion and contraction of the shell. The opposing peripheral edges of the several adjacent rings 33 and 39 are adapted to abut against each other and limit the contracting movement of the shell as well as equalize the flexing in the several corrugations. Each ring is formed in two halves, bolted together and applied to the sleeve after the latter has been shaped into corrugated form and heat treated to restore its ductility.

To effect the welded attachment of the sleeve to the pipe nipple, the latter has formed therein an elliptical shaped circumferential groove 41. This groove is then filled by welding with a suitable low carbon stainless steel alloy—25–20 for example, forming a ring-like inlay 43. The end of the nipple which is to be inserted within the tubular end of the shell is then machined to a dimension suitable for such assembly, the machining being continued from the end to be inserted to a point which is approximately at the center of the welded inlay.

The machined end of the nipple is then inserted into the tubular end 15 of the corrugated element so that the end of the latter is made to abut against the shoulder formed in the stainless steel inlay by the aforementioned machining operation and as indicated in Fig. 4.

The inlay ring 43 is preferably of such shape, size and substantial depth as to prevent the inlay from being distorted through the expansion of the pipe nipple and to present a body of stainless steel of relatively greater thickness than that of the walls of the stainless steel sleeve. With the sleeve and nipple thus assembled, the tip of the stainless steel is then welded to the stainless steel inlay by the application of a sealing welding bead 45, also of low carbon stainless steel, applied to the joint between the sleeve and the inlay. To permit the subsequent assemblage of the end ring 35, the latter has an annular recess 47 formed on the inner periphery of its face to receive the bead 45.

The interposition of the inlay of stainless steel welded to the pipe member, whether the flange 19 or the pipe nipple 31, effectually prevents the transfer at the welded joint of any substantial amount of carbon from the higher carbon metal of that member to the stainless steel of the sleeve, and similarly prevents the dilution of the chromium-nickel content of the sleeve metal from the iron of the pipe member, both of which conditions in some measure may take place at the welded joint between the inlay metal and the pipe member. This leaves the composition of the stainless steel sleeve at its welded joint in substantially its original state in respect to its low carbon content and with at least its original content of chromium and nickel, and with its original desirable characteristics at the joint unaltered both with respect to corrosion resistance and otherwise.

While the inlay 43 (Figs. 3 and 4) and the inlays 21 and 23 (Figs. 1 and 2) preferably have a thickness substantially greater than that of the walls of the sleeve, it has been found that a relatively small interposed body of the stainless steel will serve to prevent any appreciable alteration in the composition of the metal at the welded joint of the sleeve.

A further additional advantage arising from the welding of an intermediate body of metal of the same composition as that of the sleeve is due to the elimination of causes of stress corrosion in the metal of the sleeve. As previously explained, the welding of a stainless steel sleeve directly to the metal of the pipe flange or pipe nipple sets up stresses in both bodies which cannot be removed by heat treatment owing to the greater coefficient of thermal expansion of the stainless steel and these stresses are concentrated to a greater degree in the stainless element due to its lesser mass.

In the welding of the interposed inlay in the case of either the inlay 43 or 21, the maximum internal stress is concentrated either within the inlay or within the steel of the pipe member adjacent the inlay. But when the stainless steel sleeve is welded to the inlay, due to the fact that two bodies of equal thermal expansion coefficients are being welded together, the weld stresses are minimized, and so far as the sleeve is concerned may be eliminated by heat treatment, thereby removing the danger of stress corrosion at the welded joint of the sleeve.

Various compositions of ferrous metal may be employed for the pipe members, for the stainless steel of the corrugated shell and for the intermediate welded body of metal, the particular compositions hereinbefore specified being submitted as illustrative and not in a limiting sense.

While the method of effecting the described form of attachment and the structural features of the latter have been described in detail in connection with the illustrative embodiment of the invention, it is to be understood that extensive deviations may be made from the described steps of procedure and from the form details and relative arrangement of parts, all without departing from the spirit of the invention.

I claim:

1. An expansion member for a pipe line, comprising a corrugated shell of stainless steel having a tubular end, a pipe nipple adapted to be connected to an adjoining section of the pipe line, said nipple being provided with a circumferential recess, an inlay of stainless steel in said recess and welded to the metal of said nipple, the tubular end of said shell overlying said inlay and being welded thereto.

2. An expansion member for a pipe line, comprising a corrugated shell of stainless steel having a tubular end, a flanged member fitting over said tubular end and adapted to be clamped to a flange of an adjoining pipe line, said flange being formed with an annular recess to overlie the tubular end of the shell and having an attachment to said shell, the same comprising an inlay of stainless steel in said recess, welded to the metal of said flange and separately welded to the metal of said tubular end.

3. An expansion member for a pipe line, comprising a corrugated shell of stainless steel of relatively low carbon content, having a welded attachment to a pipe line member composed of ferrous metal of relatively higher carbon content to provide a corrosion-resistant, fluid-tight joint, said attachment comprising a body of stainless steel, also of relatively low carbon content, deposited by welding on the metal of the pipe member and separately welded to the metal of the shell.

4. An expansion member for a pipe line, comprising a corrugated shell of stainless steel having a welded attachment to a pipe line member, said attachment comprising a body of stainless steel deposited by welding on the metal of the pipe line member and separately welded to the metal of the shell.

5. In the manufacture of expansion joints, the method of attaching a corrugated shell of stainless steel to a pipe member, which consists in forming a recess in said member, depositing a layer of fused weld metal of stainless steel in said recess, and applying to the said layer when hardened and to the metal of the shell a further body of fused weld metal of stainless steel.

6. In the manufacture of expansion joints, the method of attaching a corrugated shell of stainless steel to a pipe member, which consists in depositing on the metal of the pipe member a layer of fused weld metal of stainless steel, allowing the layer to harden, and separately welding said layer to the metal of said shell.

7. In the manufacture of expansion joints, the method of attaching a corrugated shell of stainless steel to a pipe member, which consists in depositing on the metal of the pipe member a succession of layers of fused weld metal of stainless steel allowing each layer to harden, and separately welding the last of said layers to the metal of the shell.

8. In the manufacture of expansion joints, the method of attaching a corrugated shell of stainless steel to a pipe member, which consists in forming a recess in the pipe member, welding in said recess an inlay body of stainless steel to the metal of said pipe member, and separately welding the metal of the shell to said inlay.

9. In the manufacture of expansion joints, the method of attaching a corrugated shell of stainless steel of relatively low carbon content to a pipe member of ferrous metal of relatively high carbon content to provide a welded joint resistant to corrosion, which consists in welding one section of a ferrous body, also of relatively low carbon content, to the metal of the pipe member, and welding another section of said ferrous body to the metal of the shell.

FRANK W. DAVIS.

CERTIFICATE OF CORRECTION.

Patent No. 2,232,657. February 18, 1941.

FRANK W. DAVIS.

It is hereby certified that error appears in the printed specification of the above numbered patent requiring correction as follows: Page 1, first column, line 21, after "18%" insert the words --of chromium--; same page, second column, line 54, for "contect" read --content--; and that the said Letters Patent should be read with this correction therein that the same may conform to the record of the case in the Patent Office.

Signed and sealed this 8th day of April, A. D. 1941.

(Seal)

Henry Van Arsdale,
Acting Commissioner of Patents.